July 12, 1966   J. ATHERTON   3,260,162
SLIDE BEARINGS FOR MACHINE TOOLS
Filed Feb. 19, 1964   4 Sheets-Sheet 1
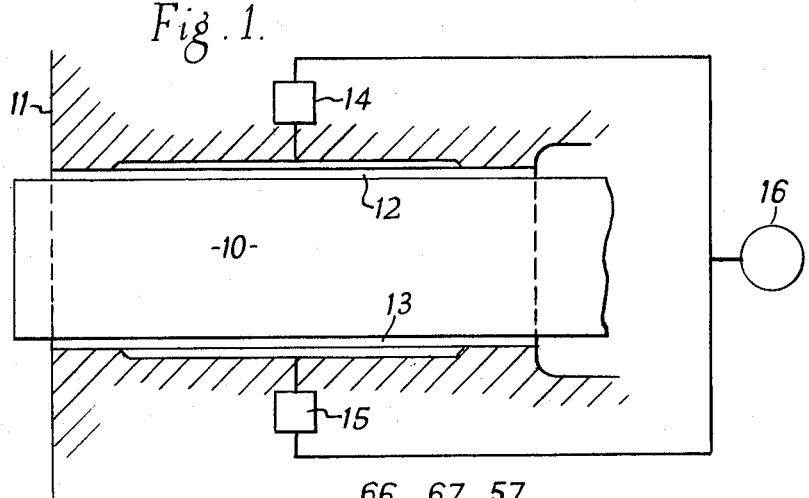
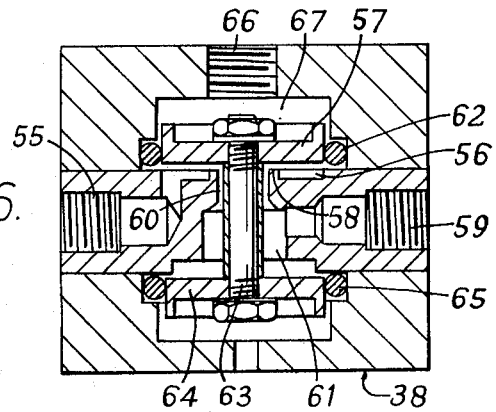
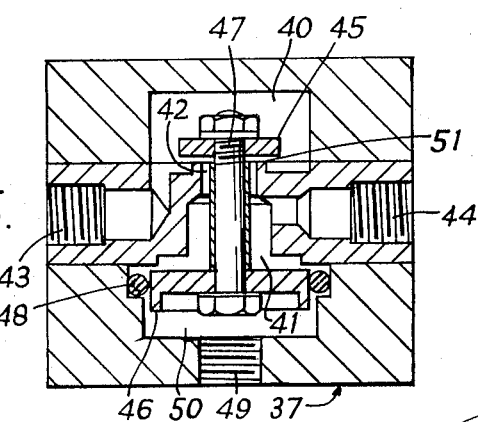
ATTORNEY

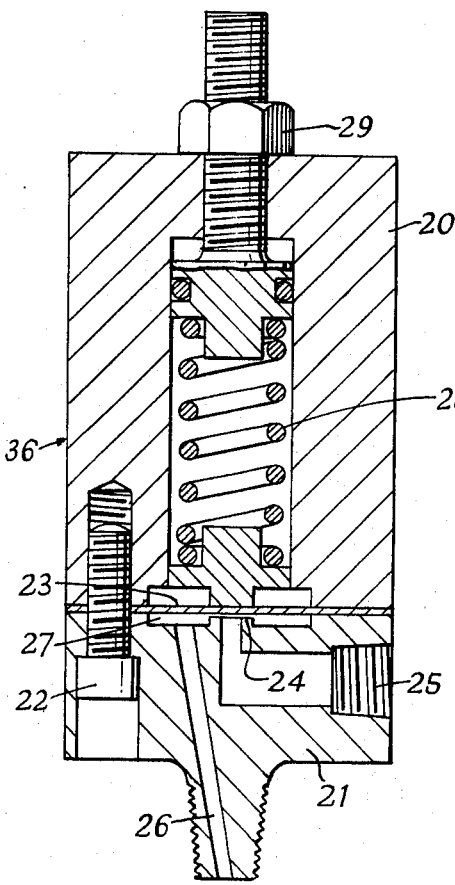
Fig. 2.
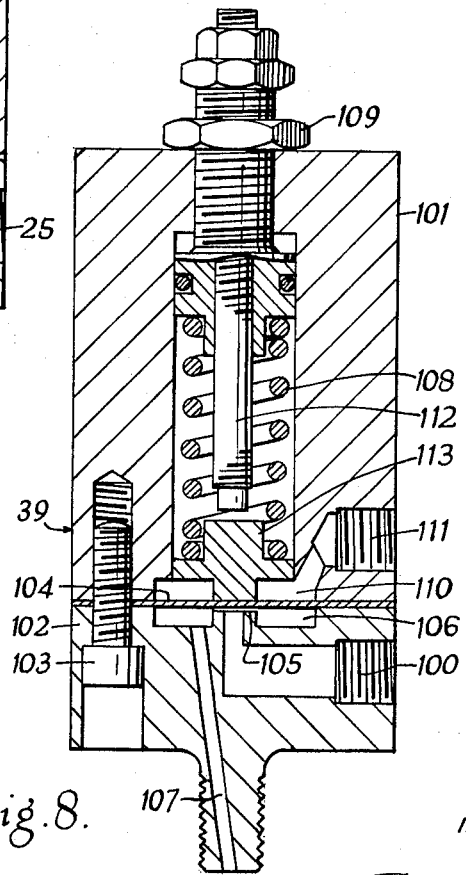
Fig. 8.
INVENTOR
ATTORNEY

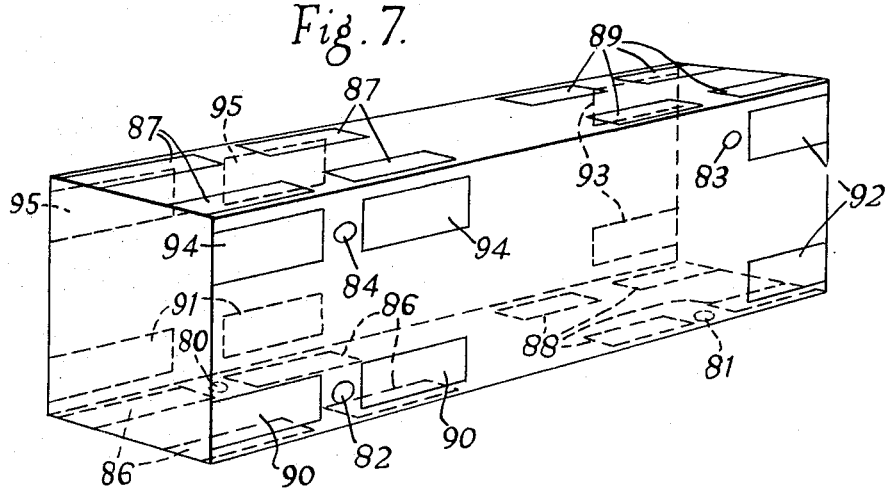
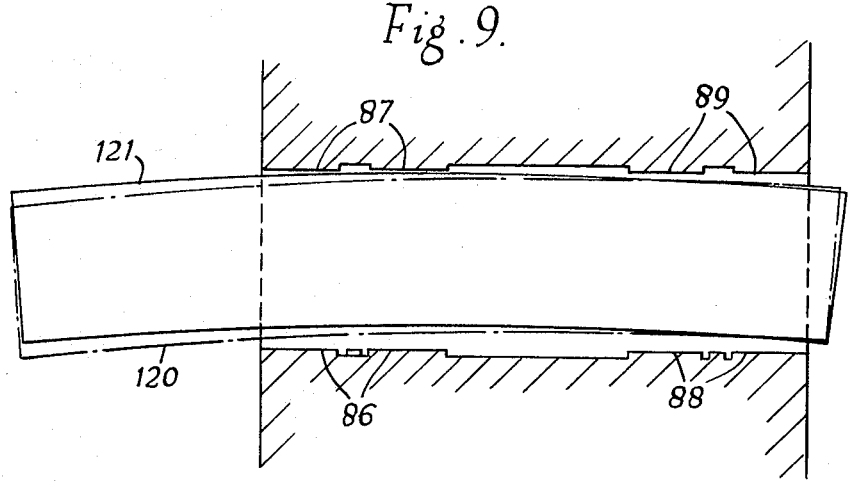
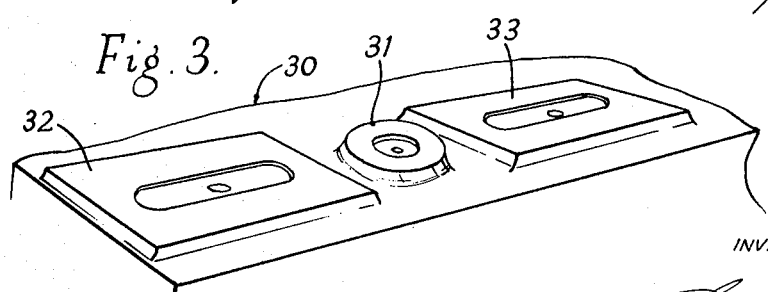
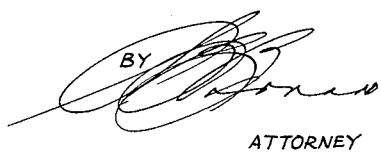

July 12, 1966  J. ATHERTON  3,260,162
SLIDE BEARINGS FOR MACHINE TOOLS
Filed Feb. 19, 1964  4 Sheets-Sheet 4
Fig. 4.
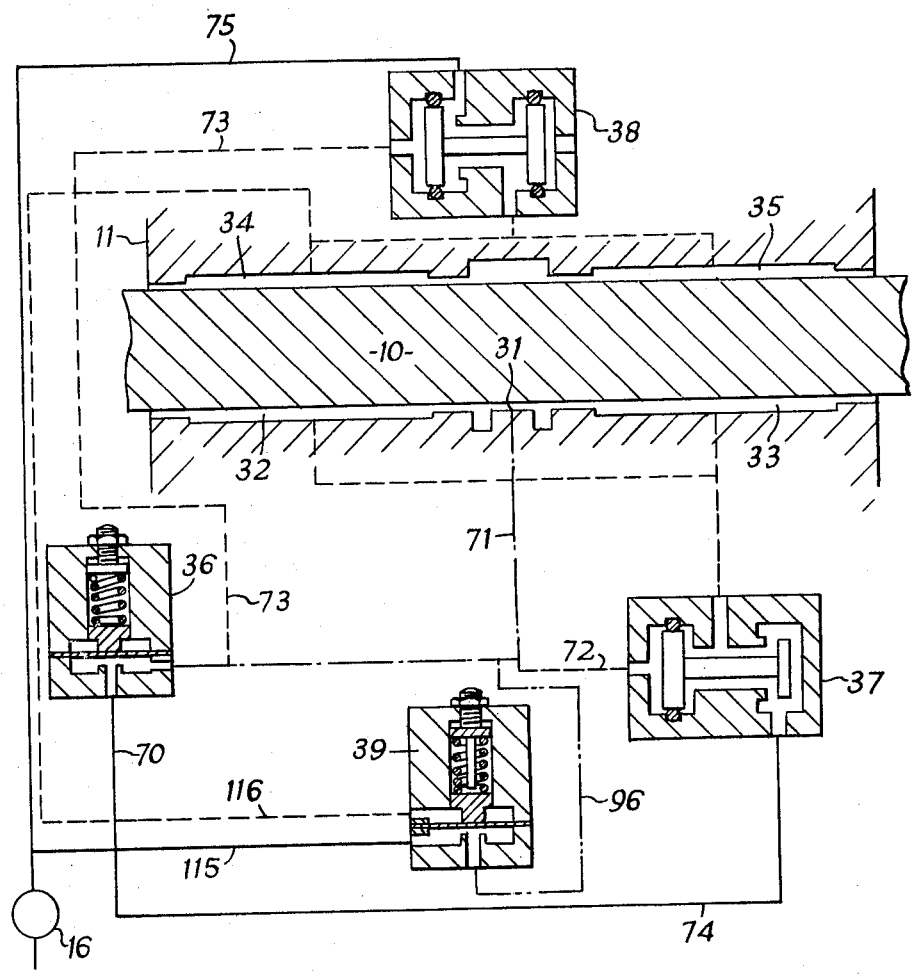
INVENTOR
ATTORNEY

United States Patent Office 3,260,162
Patented July 12, 1966

3,260,162
SLIDE BEARINGS FOR MACHINE TOOLS
John Atherton, Warley, Halifax, England, assignor to William Asquith Limited, Halifax, England, a corporation of Great Britain
Filed Feb. 19, 1964, Ser. No. 345,893
Claims priority, application Great Britain, Mar. 16, 1963, 10,498/63
14 Claims. (Cl. 90—16)

In many machine tools, for example boring and milling machines, a part of the machine which projects beyond the machine bed is supported cantilever fashion on bearing slideways on the machine bed. It will be appreciated that when a heavy member is supported in cantilever fashion, or carries heavy equipment or is subjected to lateral stress during operation on a workpiece, then such member is liable to droop or lateral deflection according to the applied load. Such droop or lateral deflection can be minimised by making the said member as rigid as possible, but in practice it is not possible to eliminate droop or lateral deflection which, although very small, may be of the order of several thousand parts of an inch at the outer or free end of the said member, and this is undesirable in a precision machine tool.

The present invention is designed to provide means for compensating for droop or lateral deflection of a member supported on bearing slideways. A further object is to arrange such compensating means so as to be automatic in operation.

According to the invention, a method of compensating for droop or lateral deflection of a member supported by a slideway comprises controlling the thickness of the oil film at any one or more of predetermined areas between the bearing surfaces. Conveniently, a controlling device responsive to variations in pressure of an oil film at one area between the bearing surfaces may be operatively connected to means for varying the oil film thickness at the same or another area between the bearing surfaces. The compensation of droop or lateral deflection may be obtained by automatically increasing the oil film thickness of certain areas at one side of the member, and reducing the film thickness of certain areas at the other side of the member, to tilt the supported member in a direction opposite to the droop or lateral deflection.

One particular arrangement for automatically compensating for droop or deflection will now be described, by way of example only, with reference to the accompanying drawings, in which:

FIGURE 1 is a diagram showing a double-film hydrostatic bearing,

FIGURE 2 is a sectional elevation of an oil flow controlling device,

FIGURE 3 is a perspective view showing two bearing pads with an associated reference pad, FIGURE 4 shows a basic support system for a single bearing with droop compensation, FIGURE 5 is a sectional elevation of an equalizing valve, FIGURE 6 is a sectional elevation of an adding valve, FIGURE 7 shows the areas, of a rectangular ram, upon which the bearing pads of an arrangement of hydrostatic bearings inside a housing act, FIGURE 8 is a sectional elevation of a pilot valve, which is a modification of the device shown in FIGURE 2, and FIGURE 9 is a diagrammatic side elevation of a member supported in a housing, showing the effect of droop compensation.

In this particular example the invention is applied to a milling and boring machine in which the member supported cantilever fashion will be termed a ram. The ram which is substantially rectangular in cross-section is disposed horizontally and is slidable longitudinally in a rectangular opening in the machine housing, the said opening having bearing slideways on all four sides. These bearings are hydrostatic bearings, in which lubricating oil is supplied under pressure so as to maintain a film of oil between the bearing surfaces of the said slideways and the bearing surfaces of the ram. As the ram is displaced along the slideways, its outer end will project to a greater or lesser extent according to requirements, as the outer end of the ram is adapted to carry tools and attachments for operating on a workpiece. Consequently, the weight of the projecting portion will vary according to the longitudinal position of the ram relatively to the bearing slideways, and will also vary according to the particular tool or attachment mounted on the outer end of the ram. The general effect will be for the outer or forward end of the ram to droop, and also for the rear end of the ram which projects rearwardly from the bearing slideways and carries an attachment to droop, so that the ram becomes slightly arcuate longitudinally.

In such circumstances, the pressure on the oil film at the front of the bearing slideways will be increased at the underside of the ram and decreased at the top side of the ram, whilst at an intermediate position between the front and rear ends of the slideways the pressure will be decreased at the underside of the ram and increased at the top side of the ram. The pressure at the rear ends of the slideways will be similar to those at the front but to a lesser degree as the main weight of the ram and tools or attachments will be at the forwardly projecting portion of the ram.

In FIGURE 1 of the drawings a ram 10 is shown as being supported in a housing 11 between two hydrostatic bearings 12 and 13. Oil is supplied to the bearing 12 by a compensator 14, and to the bearing 13 by a compensator 15, the oil being supplied to the compensators by an oil pump 16. Several known types of load compensators can be used at 14 and 15, of which the capillary tube type or the kind including two spool valves are examples, but these two particular types, being slow acting, tend to produce bearings of low static stiffness. However a variable resistor utilizing a diaphragm to control the flow of oil between an annular surface and the diaphragm has been found to provide satisfactory bearing stiffness. If, in the arrangement shown in FIGURE 1, each compensator was to control the oil film thickness of its associated bearing at a predetermined value the result would be lack of bearing stiffness as the total bearing clearance would not be exactly equal to the total gap required by the two compensators owing to machining inaccuracies. It is, therefore, necessary with compensators of oil film thickness control type to control the oil film thickness at one side of the bearing only, allowing the film thickness at the other side to be determined by the excess clearance in the bearing.

A restrictor capable of producing satisfactory bearing stiffness is shown in FIGURE 2 of the drawings, and comprises a body 20, and a block 21 secured to the body by screws 22. Disposed between the body and the block is a flexible diaphragm 23 which is used to vary the clearance between an annular surface 24 of the block 21 so as to control the flow of oil through the gap. The block is formed with an oil supply duct 25 through which oil is directed on to the diaphragm 23, causing it to pass through the restriction formed by the diaphragm and the annular surface 24. A duct 26 is also formed in the block 21 to form an exit for the oil from an annular cavity 27, into which the oil flows after passing through the restriction. The oil is then directed to the bearing surface.

As the load on the bearing is increased, the hydraulic resistance of the bearing increases, and so a build up of pressure occurs in the cavity 27. This causes the diaphragm 23 to flex and open the restriction to allow the oil to flow at a greater rate. The increase in flow has the effect of maintaining a constant oil film thickness by maintaining a constant hydraulic resistance. The deflection of the diaphragm is resisted by a spring 28 which is fitted into the body 20 and acts on the opposite side of the diaphragm to the oil pressure. The pressure of the spring is controllable by screwed means 29 to accommodate different circumstances.

It will be appreciated that it is desirable to have the bearing surface for the ram, as large as possible, but one disadvantage is that if any ram deflection occurs inside the housing, the hydraulic resistance of the bearing is effected, and consequently the restrictor will operate to maintain constant resistance of the bearing and so vary the oil film thickness. This will result in a lack of bearing stiffness and possible instability. In order to prevent this it has been found necessary to provide a surface which will be referred to as a reference pad, which is so small that the hydraulic resistance is not effected by ram deflection, and the conditions at this surface controls the flow of oil to the main bearing surfaces. FIGURE 3 shows part of a housing 30 in which a reference pad 31 is disposed between two bearing pads or surfaces 32 and 33, the oil supplied to the pads 32 and 33 being governed by the conditions at the reference pad 31.

Due to the fact that the diaphragm restrictor, as shown in FIGURE 2, works in conjunction with the reference pad and produces an oil pressure proportional to the oil flow which will support the ram as required, a system, as shown in FIGURE 4, has been designed, in which the said pressure is used to control valves which regulate the oil flow to bearing surfaces. This system is also adaptable to accommodate droop and/or lateral deflection.

The basic system shown in FIGURE 4 is applied to a double film bearing, that is, a bearing having an oil film at each of two opposite surfaces. The ram 10 is supported in a housing 11 by bearing pads 32 and 33 on one side, and bearing pads 34 and 35 on the opposite side. A reference pad 31 is disposed between the pads 32 and 33, and is served by a diaphragm restrictor 36 of the type shown in FIGURE 2. The bearing pads 32 and 33 are served by a compensator 37 which is an oil flow regulator, and will be referred to as an "equalizing valve." The bearing pads 34 and 35 are served by a compensator 38 and this will be referred to as an "adding valve." A droop compensator 39 will be described later as its operation is not necessary for normal support.

The equalizing valve 37, as shown in FIGURE 5, is designed to ensure that the pressure of oil leaving the valve and flowing to the bearing pads 32 and 33 is equal to the oil pressure produced by the reference pad 31. The valve 37 is formed with an upper cavity 40 and a lower cavity 41 connected by a hole 42. An inlet duct 43 admits oil at supply pressure and directs it into the cavity 40 from which the oil flows through the hole 42 into the cavity 41 and then through an outlet duct 44 to the bearing pads. A disc 45 is disposed in the cavity 40 and is connected to a piston 46 in the cavity 41 by a rod 47 which passes through the hole 42. A sealing ring 48 forms an oil seal between the piston 46 and the cavity 41 but allows movement of the piston within the cavity. A hole 49 is provided in the valve whereby oil, at reference pad pressure, enters the lower portion 50 of the cavity 41 and acts on the piston 46 to move the disc 45 away from an annular surface 51 which is in the cavity 40 and surrounds the hole 42. The position of the disc 45, relative to the annular surface 51, determines the outlet oil flow to the cavity 41 and then to the bearings which in turn determine the bearing pressure.

In operation, if the reference pad pressure is greater than the outlet pressure, the piston will be lifted by the reference pad pressure acting upon it and this increases the gap between the disc 45 and the annular surface 51, and so allow more oil to flow through the restrictor which increases the outlet pressure. When the outlet pressure approaches the reference pad pressure the piston is moved to reduce the restriction by the combined effect of the supply pressure on the disc 45 and the outlet pressure on the piston 46. Hence the outlet pressure is maintained substantially equal to the reference pad pressure. If the reference pad pressure is less than the outlet pressure the piston is automatically moved to reduce the size of the restriction and so reduce the outlet pressure.

The "adding valve" 38, as shown in FIGURE 6, is designed to increase the pressure of oil flowing to the bearing pads 34 and 35 when the reference pad pressure decreases, and reduce the oil pressure when the reference pad pressure increases. The "adding valve" 38 is similar to the "equalizing valve" 37 in that oil flows at supply pressure through an inlet duct 55 into an upper cavity 56, through a restriction formed by the lower surface of a piston or disc 57 and an annular surface 58 and to an exit duct 59 via a hole 60, and a lower cavity 61, the exit duct 59 directing the oil to the bearing pads 34 and 35. The "adding valve" 38 differs from the "equalizing valve" 37 in that a sealing ring 62 forms an oil seal between the piston or disc 57 and the wall of the cavity 56. Connected to the piston 57 by a rod 63 is a lower piston 64 which is disposed in the lower cavity 61, a sealing ring 65 forming an oil seal between the piston and the cavity wall. A hole 66 is formed in the valve 38 whereby oil, at reference pressure, enters the upper part 67 of the cavity 56 and acts upon the upper surface of the piston 57.

In operation, oil at supply pressure in the cavity 56 tends to lift the piston 57, against the reference pad pressure which is acting on the upper surface of the piston. This increases the gap forming the restriction and this produces an increase in the pressure of oil in the lower cavity and that flowing to the bearing pads. The oil pressure in the lower cavity 61 acts on the upper surface of the piston 64 tending to depress the piston. Consequently the valve produces a state of equilibrium, which is when the sum of the reference pad pressure and the bearing pad pressure is balanced by the supply pressure. Hence if the reference pad pressure increases the bearing pad pressure decreases.

For simplicity, the system shown in FIGURE 4 has only one double film bearing which could be applied to support a ram in either the vertical direction or in the horizontal direction. When the oil supply to the bearings is off, the ram rests on the pads 32 and 33 and the reference pad 31 if the pads are supporting the ram in vertical direction. When the supply is started, oil flows through the conduit 70 to the diaphragm restrictor 36 which allows oil to flow through the conduit 71 to the reference pad 31, and at supply pressure through the conduit 74 to the equalizing valve 37, and also through the conduit 75 to the adding valve 38. Oil at reference pad pressure acts, through the conduit 72, upon the "equalizing valve" 37, and upon the "adding valve" 38 through the conduit 73. During the period of pressure build up in the reference pad circuit, the "equalizing valve" 37 restricts the pressure of oil applied to the bottom pads 32 and 33 but the "adding valve" 38 allows supply pressure initially to flow to the pads 34 and 35, and reduces the pressure applied to the pads as the reference pad pressure increases. These conditions of pressure build up have the effect of reducing the gap at the reference pad and causes a rapid build up of pressure in this pad, whereupon, the "equalizing valve" 37 increases the pressure applied to the lower pads 32 and 33, and the "adding valve" 38 reduces the pressure applied to the pads 34 and 35, until the ram is lifted and supported upon an oil film, the thickness of which is determined by the setting of the diaphragm restrictor 36.

The effect produced by loading the ram towards the reference pad, during the pressure build up period, is particularly desirable when the pads in question support the ram in the horizontal direction, and the ram is not naturally being supported by the pads on the same side as the reference pads.

If a load is applied to the ram and its effect is to close the gap at the reference pad, which will tend to decrease the thickness of the oil film, the hydraulic resistance of the pad will increase and a pressure rise will occur. This pressure rise registers upon the "equalizing valve" which increases the flow of oil to the support pads 32 and 33. Simultaneously, the pressure rise acting upon the "adding valve" causes a drop in pressure applied to the support pads 34 and 35.

Similarly, if the load on the reference pad is reduced the presure of the pads 32 and 33 increases the gap at the reference pad, and the hydraulic resistance of the pad reduces, hence the oil pressure reduces. Consequently the "equalizing valve" and the "adding valve" function to restore the predetermined pressure at the reference pad and the predetermined oil film thickness is retained.

The system shown in FIGURE 4 is for one double film bearing which comprises two bearing surfaces functioning on opposed sides of a ram 10. To completely support and locate the ram in a housing it is necessary to provide more than one double film bearing, and an arrangement of bearing pads disposed in the housing, capable of ensuring correct location of the ram in all lateral directions, is shown in FIGURE 7, as areas of the ram upon which the several pads act. It will, however, be understood that the several pads are carried by the housing and not by the ram. In this case, where the ram 10 is of rectangular cross section, five reference pads are used to provide complete lateral location of the ram. The reference pads 80, 81, 82, 83 and 84 are arranged to locate the bottom surface and one vertical surface of the ram, and it is necessary that there be at least two reference pads on each of the two surfaces. The reference pad 80 controls the bearing pads 86 and 87, at the front end of the horizontal surfaces; the reference pad 81 controls the bearing pads 88 and 89 at the rear end of the horizontal surfaces; the reference pad 82 controls the pads 90 and 91, at the lower position, at the front end of the vertical surfaces; the reference pad 83 controls the pads 92 and 93 at the rear end of the vertical surfaces; and the reference pad 84 controls the pads 94 and 95, at the upper position, at the front end of the vertical surfaces of the ram.

The reference pads 80, 82 and 84 are positioned inside the housing away from the front face of the housing, to ensure that ram location is unaffected by any expansion that may occur in the front portion of the ram. It will be noticed that at the rear of the housing the bearing pads 88 and 89, supporting vertical loads, are larger than the bearing pads 92 and 93 which support the sides of the ram. However, the front side bearing pads 90, 91, 94 and 95 are approximately equal in size to the bearing pads 86 and 87, to counteract the torsional forces applied to the ram by the functional operation of a head fitted to an extension of ram. Consequently the ram is distorted only in the part extending outside the housing.

Droop or vertical deflection of the ram occurs due to its own weight and the weight of an attachment secured to it. However, the accuracy of the machining carried out when using an attachment is dependent only upon the path followed by the cutter of the attachment, and if the cutter follows a horizontal straight line as the ram is extended or retracted, the accuracy of machining is unimpaired by variation in droop of the ram. The position of the cutter, relative to a horizontal datum line, can be controlled, even though a variation in droop may occur, by controlling the oil film thickness of the bearings to tilt the ram in the housing as the ram is traversed.

The simplest way to control the position of the ram is to control the oil film thickness of the front bearing pads only. In this particular example, droop is compensated by introducing an additional flow of oil to the reference pad circuit as shown in FIGURE 4. The additional oil is fed into the reference pad circuit by the droop compensator 39 which is shown in FIGURE 8. The oil from the compensator 39 flows through the conduit 96, into the reference pad circuit, whereby the pressure in the circuit increases because the restriction at the reference pad is controlled by the amount of oil flowing through the bearing pads and an increase in flow produces an increase in pressure. This increase in pressure in the reference pad circuit affects the "equalizing valve" and the "adding valve" to allow more oil to flow to the bearing pads 32 and 33 and less oil to flow to the pads 34 and 35. Hence the ram is lifted until the restriction at the reference pad 31 is such that the total oil flowing through the circuit produces the predetermined pressure to statically support the ram. With this arrangement the displacement of the ram to counteract droop is determined by the amount of oil added to the reference pad circuit by the droop compensator 39. The compensator 39 is basically a diaphragm restrictor of the type shown in FIGURE 2, but the output pressure does not affect the restriction formed by the diaphragm as the area upon which the output pressure acts is very small, being that of the cross-sectional area of the outlet duct 100 adjacent to the diaphragm. The droop compensating restrictor 39 comprises a body 101 and a block 102 secured together by screws 103 in such a manner as to retain a flexible diaphragm 104 between them. The diaphragm 104 forms a restriction with an annular surface 105 of the block 102 and is adapted to vary the flow of oil through the restriction. An annular cavity 106 is formed in the block, and is connected to a supply duct 107, so that oil at supply pressure in the cavity 106 acts upon the diaphragm so as to flex it and increase the size of the restriction. A spring 108 is fitted into the body of the restrictor to resist flexing of the diaphragm, and this is controlled by a pre-loading screw device 109. A cavity 110 is formed in the body 101 and is fed by a "pilot pressure" inlet duct 111 which admits oil to the cavity 110, so that pilot pressure acts upon the upper surface of the diaphragm and tends to close the restriction. It has been found that the load carried by the front bearings in a supporting system is proportional to the load on the ram plus the applied bending moment. Accordingly the top support pad pressure, at the bearings 34 and 35 in FIGURE 4, is inversely proportional to the deflection or droop of the ram. Consequently by using the top pad pressure as the pilot pressure the additional oil flow to the reference pad will increase proportionately when the top pad pressure decreases, i.e. when the droop increases.

In operation, oil at supply pressure is fed to the inlet duct 107 of the droop compensator through the conduit 115, but if the ram is not loaded and is within the housing, the diaphragm 104 is flexed by the pilot pressure oil, which is fed to the pilot pressure inlet duct from the top bearing pads through the conduit 116, to close the restriction and prevent any oil being added to the reference pad circuit. If the ram is traversed and loaded in an extended position droop takes place and the load on the bottom front bearings is increased which, through the normal system of simple support, is accommodated by the reference pad and diaphragm restrictor 36. When the ram is supported, the pressure in the top pads is reduced by the effect of the "adding valve" 38, and this reduction in top pad pressure causes a reduction in pilot pressure in the compensating restrictor 39. With a reduction in pilot pressure in the cavity 110, the diaphragm is flexed away from the annular surface 105 to allow oil to pass through the restriction to the reference pad circuit. This additional flow of oil results in an increase in the reference pad pressure which causes the "equalizing valve" 37 to increase the flow to the bottom pads 32 and 33, and the "adding valve" 38 to reduce the flow to the top pads 34 and 35, and this causes the ram to be lifted until the gap at the reference pad is such as to allow the total oil flowing in the circuit to flow at the pressure required to support the ram in the elevated position.

A screw 112 is provided in the body of the compensating restrictor 39 to limit the maximum value of compensation by limiting the movement of a collar 113, which is lifted by the diaphragm. This limitation of the diaphragm prevents an increase in flow, form the compensator, over the maximum flow, as it is desirable to avoid contact of the ram with the top of the housing due to excessive lift, even though the pilot pressure may continue to be reduced by an increased load or bending moment.

A ram supported in a housing is shown in FIGURE 9, the position of the ram indicated at 120, in broken lines without droop compensation, and the position indicated at 121 is with droop compensation. It can be seen that the oil film thickness of the bearing pads 86 is greater with droop compensation than without, and that the ram has been lifted to accommodate for droop.

During the pressure build up period at the commencement of supporting the ram, the droop compensator does not affect the sequence of events as the "adding valve" admits oil to the upper bearings at approximately supply pressure, and as this pressure controls the droop compensator, and is in excess of normal support pressure, the restriction is closed and additional oil is not admitted to the reference pad circuit.

Although droop compensation has been described as beng used with the front bearings only, it will be appreciated that it can be used in conjunction with any or all of the reference pad circuits so as to counteract lateral deflection and/or deflection of the ram due to torque, as well as vertical deflection.

It will be understood that the sensing devices for controlling the hydraulic supply to the bearings for droop compensation could be pneumatic or electrical.

As compensation for deflection can take place at all the oil supply points of the slideways, it will be appreciated that compensation can be made in all directions, and that a given point on the ram can be substantially fixed in space whilst the ram is stationary irrespective of variations in loading on the ram, and if the ram was to be traversed longitudinally, the said point would travel in a substantially straight line irrespective of variations in loading on the ram.

The compensation referred to above will be limited by the clearance of the hydrostatic bearings, and consequently, droop or lateral deflection of greater extent cannot be compensated but will be minimised by the compensating means of the present invention. It will be understood that although oil is referred to above, any other convenient fluid may be used. Furthermore, whilst the invention has been described as applied to the ram of a milling and boring machine, it can equally well be adapted for use in other machines when a member is supported cantilever fashion on bearing slideways, for example a stationary or travelling cantilever beam, slide headstock or table member.

I claim:
1. A machine tool comprising a slideway, a ram mounted for sliding movement in said slideway, hydrostatic support means for said ram within said slideway, a source of fluid supply, means for detecting the pressure at a predetermined area of said hydrostatic support means, a first hydraulic control circuit including a reference pad spaced from said predetermined area for detecting pressure in said hydrostatic support means between said ram and said slideway, said first hydraulic circuit controlling fluid supply to said hydrostatic support means to support said ram, a second hydraulic control circuit connected to said first hydraulic control circuit to vary the fluid pressure within said first control circuit to compensate for deflection of said ram, by varying the pressure in the hydrostatic support means in response to variation in the detected pressure at said predetermined area of said hydrostatic support means, said means for detecting the pressure at a predetermined area of said hydrostatic support means comprises a pressure controlled valve controlling fluid flow in said second control circuit, said pressure controlled valve comprises a housing, a diaphragm disposed within said housing, a surface within said housing, said diaphragm and said surface forming a fluid restriction, means mounting said diaphragm for movement in responses to fluid pressure towards and away from said surface to vary the size of the restriction.

2. A machine tool comprising a slideway, a ram mounted for sliding movement in said slideway, hydrostatic support means for said ram within said slideway, a source of fluid supply, means for detecting the pressure at a predetermined area of said hydrostatic support means, a first hydraulic control circuit including a reference pad spaced from said predetermined area for detecting pressure in said hydrostatic support means between said ram and said slideway, said first hydraulic circuit controlling fluid supply to said hydrostatic support means to support said ram, a second hydraulic control circuit connected to said first hydraulic control circuit to vary the fluid pressure within said first control circuit to compensate for deflection of said ram, by varying the pressure in the hydrostatic support means in response to variation in the detected pressure at said predetermined area of said hydrostatic support means, said first hydraulic control circuit comprises an adding valve controlling the rate of flow of fluid to one side of said ram and an equalizing valve controlling the rate of flow of fluid to the opposite side of the said ram.

3. A machine tool as claimed in claim 2 wherein said equalising valve comprises a housing, a diaphragm within said housing, a surface within said housing, said diaphragm and said surface forming a fluid restriction, a piston, means connecting said diaphragm to said piston, resilient means holding said piston within said housing and resisting movement of said piston, and said diaphragm towards and away from said surface, and conduit means connecting the interior of said housing on one side of said piston with said second hydraulic circuit and with said reference pad.

4. A machine tool as claimed in claim 3, in which said equalising valve has an inlet and an outlet on opposite sides of said restriction, the effective areas of said piston and said diaphragm being such that pressure on the outlet side of said restriction is substantially equal to pressure on the conduit side of said piston.

5. A machine tool as claimed in claim 2, wherein said adding valve comprises a housing, a diaphragm disposed within said housing, a surface within said housing, said diaphragm and said surface forming a fluid restriction, means mounting said diaphragm for movement in response to fluid pressure towards and away from said surface to vary the size of the restriction.

6. A machine tool as claimed in claim 5 wherein said adding valve comprises a housing, a diaphragm within said housing and a surface within said housing, said diaphragm and said surface forming a restriction, resilient means mounting said diaphragm within said housing and forming a seal between said housing and said diaphragm, inlet and outlet ports on opposite sides of said restriction, a piston within said housing, means connecting said piston and said diaphragm, resilient means mounting said piston within said housing and forming a seal between said piston and said housing, and conduit means connecting the interior of said housing on one side of said diaphragm with said second hydraulic circuit and with said reference pad.

7. A machine tool as claimed in claim 2 wherein said equalising valve comprises a housing, a diaphragm within said housing, a surface within said housing, said diaphragm and said surface forming a fluid restriction, a piston, means connecting said diaphragm to said piston, resilient means holding said piston within said housing and resisting movement of said piston, and said diaphragm towards and away from said surface, and conduit means connecting the interior of said housing on one side of said piston with said second hydraulic circuit and with said reference pad, said equalising valve having an inlet connected to said source of fluid supply and an outlet on the opposite side of said restriction to said inlet, conduit means connecting said outlet with said hydrostatic support means on one side of said ram, the effective areas of said piston and said diaphragm being such that pressure on the outlet side of said restriction is substantially equal to pressure on the conduit side of said piston; said adding valve comprising a housing, a diaphragm within said housing and a surface within said housing, said diaphragm and said surface forming a restriction, resilient means mounting said diaphragm within said housing and forming a seal between said housing and said diaphragm, an inlet connected to said source of fluid supply, and an outlet on the opposite side of said restriction to said inlet, conduit means connecting said outlet with said hydrostatic support means on the opposite side of said ram, a piston within said housing, means connecting said piston and said diaphragm, resilient means mounting said piston within said housing and forming a seal between said piston and said housing, and conduit means connecting the interior of said housing on one side of said diaphragm with said second hydraulic circuit and with said reference pad.

8. A machine tool as claimed in claim 1 wherein a conduit connects one side of said diaphragm with said predetermined area of said hydrostatic support means.

9. A method of compensating for bending of a member having bearing surfaces, supported hydrostatically at said bearing surfaces in a slideway and having an unsupported portion extending beyond said bearing surfaces, said bending being caused by gravity acting upon said unsupported portion, comprising sensing a thickness differential in the fluid film supporting said member at said bearing surfaces, said thickness differential being caused by tilting of said member under the influence of gravity acting upon said unsupported portion, instantaneously compensating for said tilting by equalizing the thickness of the fluid film in response to said sensing of the thickness differential, said equalizing of the fluid film thickness creating a pressure differential in the fluid film, sensing said pressure differential, and instantaneously, in response to the sensing of said pressure differential, producing a differential in the thickness of the fluid film to tilt said member in a direction opposite to the direction of the bending to compensate for the bending.

10. A method according to claim 9, wherein the differential in the thickness of the fluid film is produced by increasing the thickness of a predetermined part of the fluid film between said bearing surfaces and said slideway at a side of said member opposite to the direction of the bending.

11. A method according to claim 9, wherein the differential in the thickness of the fluid film is produced by increasing the thickness of a predetermined part of the fluid film between a first one of said bearing surfaces and the slideway at a first side of the member and simultaneously decreasing the thickness of a predetermined part of the fluid film between a second one of said bearing surfaces and the slideway at a second side of the member.

12. A machine tool comprising a slideway, a member mounted for sliding movement in said slideway, said member having bearing surfaces, hydrostatic support means for supporting said member at said bearing surfaces in said slideway, said hydrostatic support means including means to supply a fluid film between said slideway and said bearing surfaces for the hydrostatic support of said member, said member being slidable so that a portion of said member extends beyond said hydrostatic support means, said portion is therefore unsupported and gravity acting upon said unsupported portion causes bending of said member, means for sensing a thickness differential in the fluid film supporting said member at said bearing surfaces, said thickness differential being caused by tilting of said member under the influence of gravity acting upon the unsupported portion, means for instantaneously equalizing the thickness of the fluid film in response to the sensing of the thickness differential, thereby compensating for said tilting and creating a pressure differential in the fluid film, means for sensing said pressure differential and means for instantaneously acting in response to the sensing of said pressure differential by producing a differential in the thickness of the fluid film to tilt said member in a direction opposite to the direction of the bending to compensate for the bending.

13. A machine tool according to claim 12, wherein said means for sensing a thickness differential in the fluid film includes means for sensing the pressure of a predetermined portion of the fluid film, said means for instantaneously equalizing the thickness of the fluid film includes a first hydraulic control circuit, said first hydraulic circuit controlling fluid supply to said hydrostatic support means, and said means for instantaneously producing a differential in the thickness of the fluid film including a second hydraulic circuit connected to said first hydraulic circuit to adjust the fluid pressure within said first hydraulic circuit.

14. A machine tool according to claim 12, wherein said means for sensing the pressure of a predetermined portion of the fluid film comprises a pressure controlled valve controlling fluid flow in said second hydraulic circuit.

References Cited by the Examiner

UNITED STATES PATENTS

| 2,788,862 | 4/1957 | Langer | 184—5 |
| 2,793,570 | 5/1957 | Berthiez | 90—14 |
| 3,032,142 | 5/1962 | Axer et al. | 184—5 |
| 3,097,568 | 6/1963 | Kampmeier | 90—14 |
| 3,109,514 | 11/1963 | Deflandre | 184—5 |

FOREIGN PATENTS 840,751   7/1960   Great Britain.

OTHER REFERENCES

Webster's New Collegiate Dictionary, 1961, Merriam Company, page 217.

ANDREW R. JUHASZ, *Primary Examiner.*

WILLIAM W. DYER, Jr., *Examiner.*

L. VLACHOS, *Assistant Examiner.*